United States Patent [19]

Ide

[11] Patent Number: 5,506,022
[45] Date of Patent: Apr. 9, 1996

[54] OPTICAL INFORMATION-RECORDING MEDIUM

[75] Inventor: Tatsunori Ide, Tokyo, Japan

[73] Assignee: NEC Corporation, Tokyo, Japan

[21] Appl. No.: 260,827

[22] Filed: Jun. 16, 1994

[30] Foreign Application Priority Data

Jun. 17, 1993 [JP] Japan .................... 5-145299
Feb. 3, 1994 [JP] Japan .................... 6-011872

[51] Int. Cl.$^6$ .................................................. B32B 3/00
[52] U.S. Cl. .................... 428/64.1; 428/64.2; 428/64.44; 428/64.5; 428/457; 428/913; 430/270.1; 430/495.1; 430/945; 369/283; 369/288
[58] Field of Search ................. 428/64, 65, 457, 428/913, 64.1, 64.2, 64.4, 64.5; 430/945, 270, 495; 346/76 L, 135.1; 369/283, 288

[56] References Cited

U.S. PATENT DOCUMENTS

| | | | |
|---|---|---|---|
| 5,147,701 | 9/1992 | Funkawa | 428/64 |
| 5,171,618 | 12/1992 | Suzuki | 428/64 |

FOREIGN PATENT DOCUMENTS

| | | |
|---|---|---|
| 0319037 | 12/1987 | European Pat. Off. . |
| 0360466 | 10/1988 | European Pat. Off. . |
| 1-149238 | 6/1989 | Japan . |
| 2-73537 | 3/1990 | Japan . |
| 1-113451 | 4/1990 | Japan . |
| 3-41638 | 2/1991 | Japan . |

Primary Examiner—Patrick J. Ryan
Assistant Examiner—Elizabeth Evans
Attorney, Agent, or Firm—Sughrue, Mion, Zinn, Macpeak & Seas

[57] ABSTRACT

An optical information-recording medium includes a substrate, and a lower protective layer, a recording layer, an upper protective layer, and a reflective layer, formed on the substrate. The recording layer exhibits different optical properties dependent on different thermal histories of a rise and a fall in temperature caused by irradiation of a laser beam on the substrate. The optical information-recording medium has a layer structure constructed such that reflectivity of the optical information-recording medium and the phase of light reflected therefrom vary with the change in the optical properties of the recording layer, with absorptivity of light of the recording layer being larger when the recording layer is in a crystalline state than when the recording layer is in an amorphous state, and at the same time, reflectivity exhibited when the recording layer in the crystalline state being 10% or higher. The reflective layer has a thickness set such that a value of reflectivity of the reflective layer exhibited in the form of a single layer is 90% or more of a value of reflectivity of a bulk form of a substance of the reflective layer, or to a value of 40 nm or larger.

22 Claims, 6 Drawing Sheets

OPTICAL INFORMATION-RECORDING MEDIUM

BACKGROUND OF THE INVENTION

1. Field of the Invention

This invention relates to an optical information-recording medium for recording information by utilizing changes in optical properties thereof induced by different thermal histories of a rise and a fall of temperature caused by irradiation of a laser beam thereon, i.e. a phase change optical disk.

2. Description of the Related Art

An optical disk for recording and reproducing information by the use of a laser beam now can be used as a large-capacity portable file memory, and a ROM-type, a direct read after write-type, and a writable-type magneto-optical disks have already been put into practical use. As a type of optical disk which permits overwriting, a phase change optical disk, an exchange coupled magneto-optical disk, and a magnetic field modulation magneto-optical disk are known. Among them, the phase change optical disk is adapted to perform recording and erasing by a change in the optical properties thereof induced by a thermal history of a rise and a fall of temperature caused by irradiation of a laser beam thereon. That is, this type of optical disk is adapted to record information or overwrite new information on old one, by modulating optical energy irradiated thereon between two intensity levels correspondent to two states thereof which can be optically discriminated from each other. Hereinafter, of the two energy (intensity) levels, the higher level will be referred to as a recording power level, while the lower level as an erasing power level. Reproduction of information is performed normally by detecting changes in reflectivity or transmittance between the two states.

To improve the recording density of the optical disks, a mark edge recording method in which information is imparted to both ends of each recording mark is now under study or development. A recording medium used in the phase change optical disk is generally higher in absorptivity when it is in the amorphous state than when it is in the crystalline state, and therefore, in performing overwriting by the mark edge recording method, the length or position of each recording mark recorded varies depending on whether the recording mark is recorded on the amorphous state or on the crystalline state, and this results in degraded overwriting characteristics, such as increased recording jitter, and a lower erasability resulting from modulation of an overwriting signal, which occurs in dependence on the existing or recorded information. Further, when taking into consideration the fact that more latent heat is consumed in fusion and the thermal conductivity is larger in the crystalline state than in the amorphous state, the layer structure of a phase change optical disk should be designed such that absorptivity in the crystalline state becomes higher than one in the amorphous state.

As means for providing such a recording medium, an invention proposed by Japanese Unexamined Patent Publication (Kokai) No. 1-149238 is known. In this invention, absorptivity in the crystalline state is increased by reducing the thickness of a reflective layer formed of a metal to make it transparent, thereby reducing the reflectivity and absorptivity of the reflective layer. However, when the thickness of the metal reflective layer is set to a reduced value, optical characteristics of the resulting medium largely depends on the layer thickness, and hence there arises a problem of a strict or close manufacturing tolerance of thickness of the reflective layer. FIG. 1 shows the relationship between the thickness of a single Au layer formed on a glass substrate and reflectivity of the layer exhibited in reflecting light irradiated on the substrate. The invention disclosed in Japanese Unexamined Patent Publication (Kokai) No. 1-149238 obtains desired effects by reducing the thickness of the Au layer as the reflective layer to 20 nm, thereby lowering the reflectivity of the reflective layer. However, as can be understood from FIG. 1, the resulting reflectivity largely depends on the layer thickness, when the layer thickness is small, for example 20 nm or less. Therefore, if the layer thickness is largely deviated from a specified value, this causes a large undesirable change in the reflectivity of the reflective layer, resulting in a large amount of deviation from the desired optical properties of the recording medium. In short, the manufacturing tolerance of the thickness of the reflective layer is so strict or close. Further, when the thickness of the reflective layer is small, the cooling rate of the medium becomes low, and hence thermal load thereon becomes large, which can cause a problem of degraded characteristics occurring with repetition of recording and erasing.

To make the absorptivity in the crystalline state higher than that in the amorphous state, there is proposed another method which employs optical phase encoding (i.e. optical phase difference reproduction). In the case of the phase change optical disk, in general, the difference in reflectivity between the amorphous state and the crystalline state is detected for reproduction of information, and to increase the signal strength, it is required to increase the difference in reflectivity between the amorphous state and the crystalline state. Normally, the recording medium is more often used after being crystallized. Therefore, the reflectivity in the crystalline state is set to a higher value, and the absorptivity of the crystalline state is set to a lower value when the disk is arranged to include a reflective layer. However, if the method of optical phase encoding is used, in which the optical phase difference between light reflected from the amorphous state and light reflected from the crystalline state is utilized, it is not necessarily required to increase the difference in reflectivity to enhance the signal strength, which facilitates increasing the absorptivity in the crystalline state. Examples of such phase difference reproduction are disclosed in Japanese Unexamined Patent Publication (Kokai) No. 2-73537, Japanese Unexamined Patent Publication (Kokai) No. 2-113451, Japanese Unexamined Patent Publication (Kokai) No. 3-41638, etc. These inventions, however, are constructed such that there is little difference in reflectivity between the amorphous state and the crystalline state, with a large phase difference between reflected lights, and hence, optical characteristics of the recording medium largely depend on the layer thickness, which results in a small manufacturing tolerance of layers. Further, according to the layer arrangement disclosed in preferred embodiments of the known publications, reflectivity is set to a value as low as approximately 8% or lower, which results in a problem of unstable servo-mechanism.

SUMMARY OF THE INVENTION

It is an object of the invention to provide an optical information-recording medium for recording information by utilizing changes in optical properties thereof induced by different thermal histories of a rise and a fall of temperature caused by irradiation of a laser beam thereon, i.e. a phase change optical disk, which has a large manufacturing tolerance, excellent overwriting characteristics in mark edge recording, and an excellent reliability in repetition of overwriting.

To attain the above object, the present invention provides an optical information-recording medium including a substrate, and a lower protective layer, a recording layer, an upper protective layer and a reflective layer, formed on the substrate, the recording layer exhibiting different optical properties dependent on different thermal histories of a rise and a fall in temperature caused by irradiation of a laser beam on the substrate, wherein the optical information-recording medium has a layer structure constructed such that reflectivity of the optical information-recording medium and a phase of light reflected therefrom vary with the change in the optical properties of the recording layer, with absorptivity of light of the recording layer being larger when the recording layer is in a crystalline state than when the recording layer is in an amorphous state, and at the same time, reflectivity exhibited when the recording layer is in the crystalline state being 10% or higher; and wherein the reflective layer has a thickness set such that a value of reflectivity of the reflective layer exhibited in the form of a single layer is 90% or more of a value of reflectivity of a bulk form of a substance of the reflective layer, or to a value of 40 nm or larger.

The optical information-recording medium of the present invention is constructed such that the reflectivity of the medium and the phase of reflected light change with a change in the optical properties of the recording layer, and therefore, it is possible to obtain a high-quality signal without increasing the difference in reflectivity between the crystalline state and the amorphous state. Therefore, the absorptivity of the recording layer exhibited when the recording layer is in the crystalline state can be enhanced more easily, which provides excellent overwriting characteristics in mark edge recording. Further, the reflectivity exhibited in the crystalline state of the recording layer is high, and hence the servo-mechanism is stabilized. Further, since it is possible to enhance the absorptivity of the recording layer in the crystalline state thereof without reducing the thickness of the reflective layer, thermal load on the medium is reduced to thereby achieve a high reliability in repetition of recording and erasing of information. The thickness of the reflective layer is set to such a range as indicated by the arrows in FIG. 1, in which the reflectivity of the reflective layer exhibits a value of 90% or higher of the reflectivity of a bulk form of the substance used for the reflective layer. Therefore, the reflectivity of the reflective layer is not easily changed, while permitting a large manufacturing tolerance of the reflective layer.

The above and other objects, features, and advantages of the invention will become more apparent from the following detailed description taken in conjunction with the accompanying drawings.

DETAILED DESCRIPTION OF THE PREFERRED EMBODIMENTS

Next, the invention will be described in detail with reference to drawings.

Figure 2:
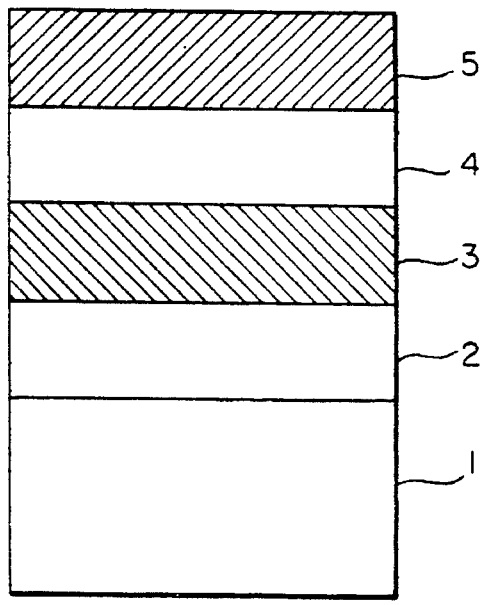
FIG. 2 is a schematic diagram showing the basic constitution of an optical information-recording medium according to the invention.

Referring first to FIG. 2, there is shown the basic constitution of an optical information-recording medium in cross-section. On a transparent substrate 1, there are formed a lower protective layer 2, a recording layer 3, an upper protective layer 4 and a reflective layer 5. The recording layer 3 is formed of a substance which has its optical properties changed depending on different thermal histories of a rise and a fall of temperature caused by irradiation of a laser beam thereto at different energy levels, e.g. a compound containing a chalcogen-series atom, for example, Se and Te. The lower protective layer 2 and the upper protective layer 4 are layers for protecting the recording layer from heat, and at the same time used for optical interference. Therefore, their thickness is set to a desired value such that reflectivity of the medium as well as phase of reflected light vary with changes in the optical properties of the recording layer 3. It is preferred that the lower protective layer 2 and the upper protective layer 4 are formed of a single substance selected from nitrides, for example, $Si_3N_4$ and AlN, which are transparent, oxides, for example, SiO, $SiO_2$ and $Ta_2O_5$, and chalcogenides, for example, ZnS, ZnSe, and MnS, or a mixture thereof. The reflective layer 5 may be formed of a single substance selected from metals, for example, Al, Au, Ti, Cr, Mo, W and Ta. Alternatively, a mixture of such a substance and an additive, or an alloy of such a substance may be used for control of the reflectivity and thermal diffusivity of the reflective layer 5, and for enhancing adherence of the same to adjacent layers. Further, semiconductors, for example, Si and Ge, which are high in refractive index, can be used as well.

The invention will be described in further detail based on Examples.

EXAMPLE 1

Figure 3:
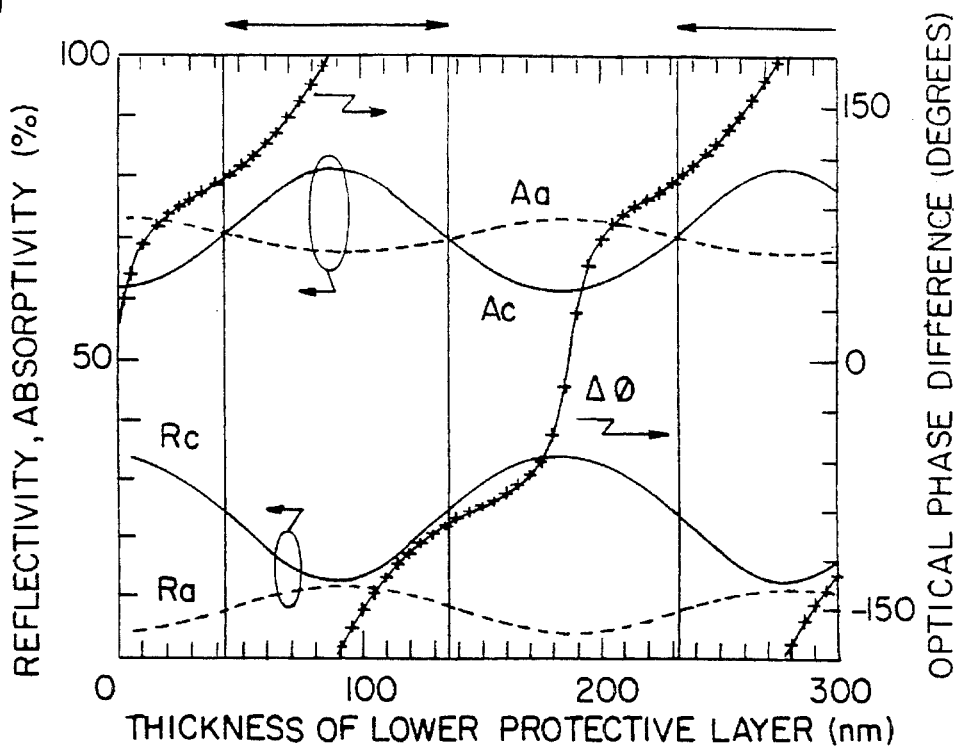
FIG. 3 is a diagram showing changes in reflectivity, changes in absorptivity and optical phase differences caused by phase change of a recording layer, depicted in relation to the thickness of a lower protective layer of the optical information-recording medium according to the invention.

On a substrate of polycarbonate, there were formed, one upon another, in the order mentioned hereafter, a lower protective layer of ZnS-20at%$SiO_2$ with a thickness ranging from 5 nm to 300 nm, a recording layer of $Ge_2Sb_2Te_5$ with a thickness of 20 nm, an upper protective layer of ZnS-20at%$SiO_2$ with a thickness of 20 nm, and a reflective layer of Al with a thickness of 60 nm. Then, there were calculated a value of reflectivity Rc and a value of absorptivity Ac of a recording medium thus arranged, which were exhibited when the recording layer 3 was in the crystalline state, and a value of reflectivity Ra and a value of absorptivity Aa of the same, which were exhibited when the recording layer 3 was in the amorphous state, as well as the optical phase difference $\Delta\phi$ between reflected light from the amorphous state and that from the crystalline state. FIG. 3 shows results of the calculations. The wavelength of a laser beam was 830 nm. Reflectivity and the optical phase difference between the reflected lights can be determined from optical constants of the recording layer, the protective layers, and the reflective layer, and thicknesses of the layers, by a matrix method (refer, for example, to Masao Tsuruta, "Applied Optics II", Applied Physics Engineering Selections Vol. 2, Baifu-kan, 1990, Chapter 4). The optical constants of the lower protective layer and the upper protective layer were 2.2-i0.0, and the optical constant of the recording layer was 5.89-i3.47 in the crystalline state, and 4.60-i1.06 in the amorphous state, and that of the reflective layer was 2.83-i7.75.

As indicated by arrows in FIG. 3, when the thickness of the lower protective layer was within a range of 43 nm to 137 nm, and a range of 232 nm to 300 nm, absorptivity was higher in the crystalline state than in the amorphous state, with reflectivity in the crystalline state being 10% or higher. Further, in this range, the optical phase difference between reflected light from the crystalline state and reflected light from the amorphous state was large, with the absolute value thereof being equal to 90° or larger.

EXAMPLE 2

Figure 4:
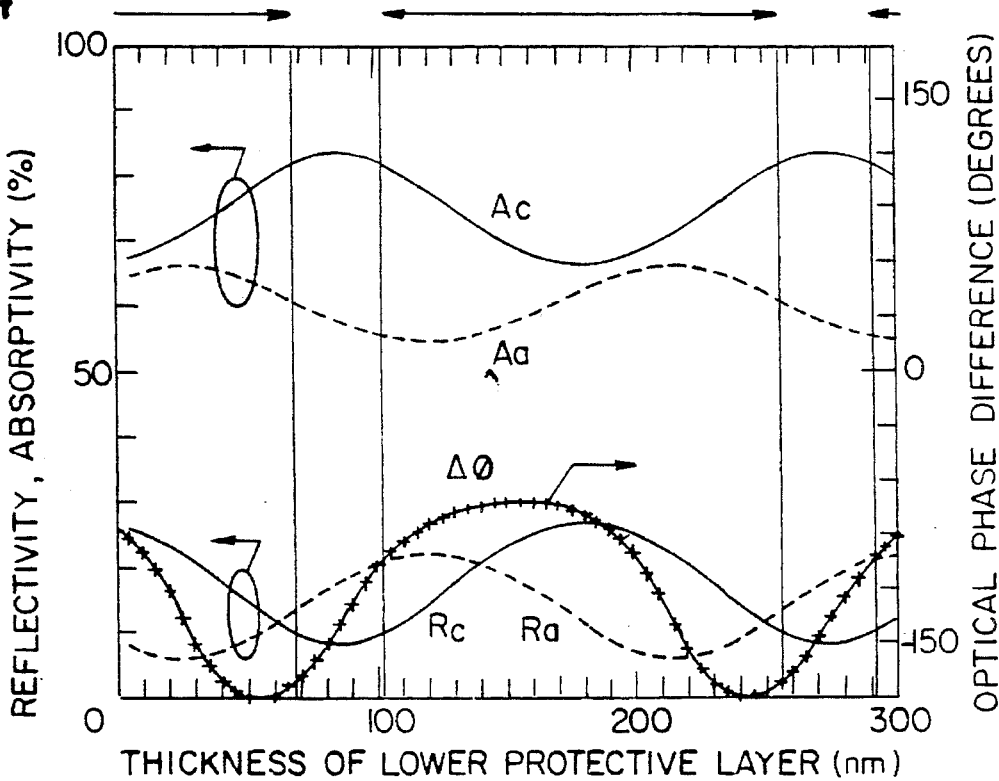
FIG. 4 is a diagram showing changes in reflectivity, changes in absorptivity and optical phase differences caused by phase change of a recording layer, depicted in relation to the thickness of a lower protective layer of the optical information-recording medium according to the invention.

Specimens of the recording medium were prepared in the same manner as in Example 1 with the exception that the thickness of the recording layer was set to 15 nm. Results of calculations are shown in FIG. 4. As indicated by arrows in FIG. 4, when the thickness of the lower protective layer was within a range of 5 nm to 67 nm, a range of 102 nm to 256 nm, and a range of 291 nm to 300 nm, the absorptivity was higher in the crystalline state than in the amorphous state, with reflectivity in the crystalline state being 10% or higher.

EXAMPLE 3

Figure 5:
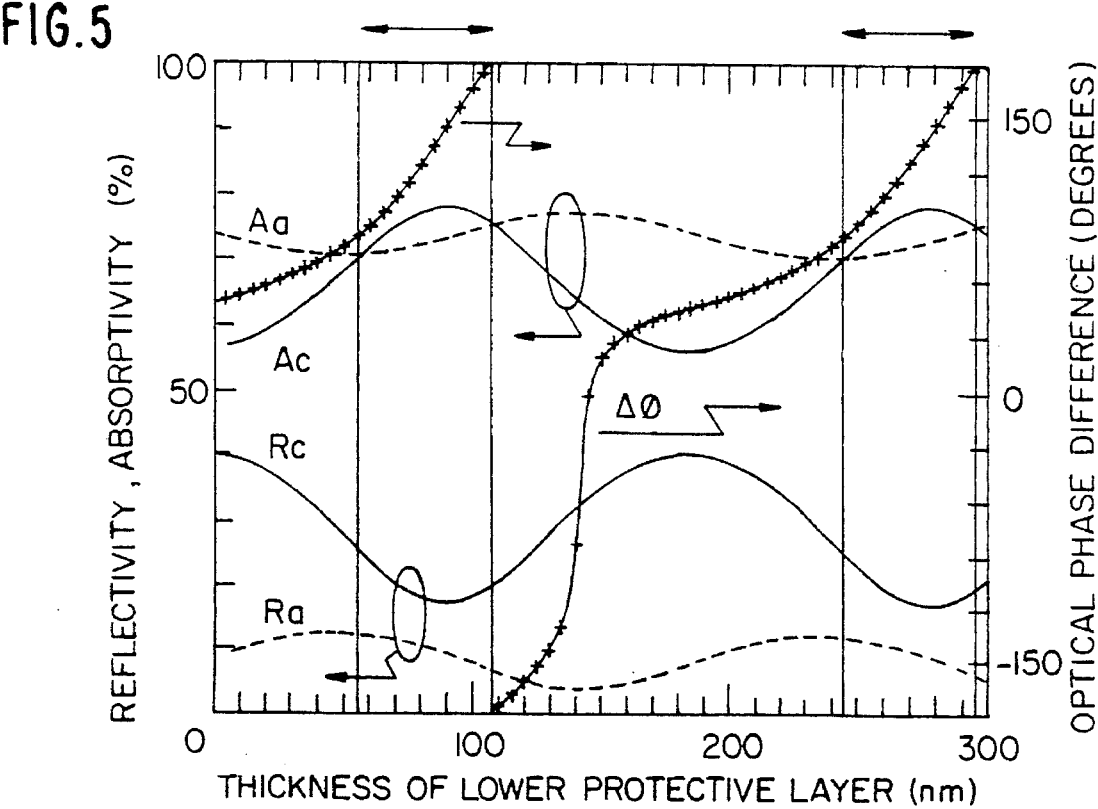
FIG. 5 is a diagram showing changes in reflectivity, changes in absorptivity and optical phase differences caused by phase change of a recording layer, depicted in relation to the thickness of a lower protective layer of the optical information-recording medium according to the invention.

Specimens of the recording medium were prepared in the same manner as in Example 1 with the exception that the thickness of the recording layer was set to 25 nm. Results of calculations are shown in FIG. 5. As indicated by arrows in FIG. 5, when the thickness of the lower protective layer was within a range of 56 nm to 107 nm and a range of 244 nm to 296 nm, absorptivity was higher in the crystalline state than in the amorphous state, with reflectivity in the crystalline state being 10% or higher.

EXAMPLE 4

Figure 6:
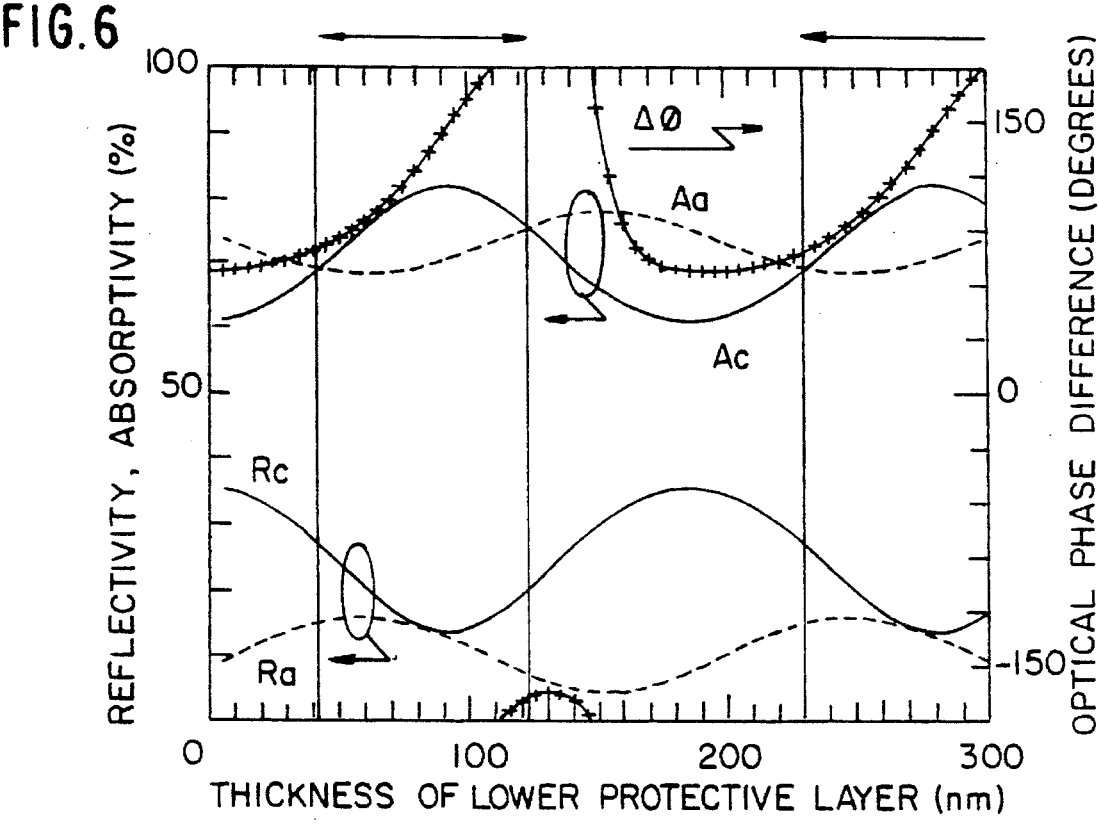
FIG. 6 is a diagram showing changes in reflectivity, changes in absorptivity and optical phase differences caused by phase change of a recording layer, depicted in relation to the thickness of a lower protective layer of the optical information-recording medium according to the invention.

Specimens of the recording medium were prepared in the same manner as in Example 1 with the exception that the thickness of the recording layer was set to 30 nm. Results of calculations are shown in FIG. 6. As indicated by arrows in FIG. 6, when the thickness of the lower protective layer was within a range of 42 nm to 122 nm and a range of 230 nm to 300 nm, absorptivity was higher in the crystalline state than in the amorphous state, with reflectivity in the crystalline state being 10% or higher.

EXAMPLE 5

Figure 7:
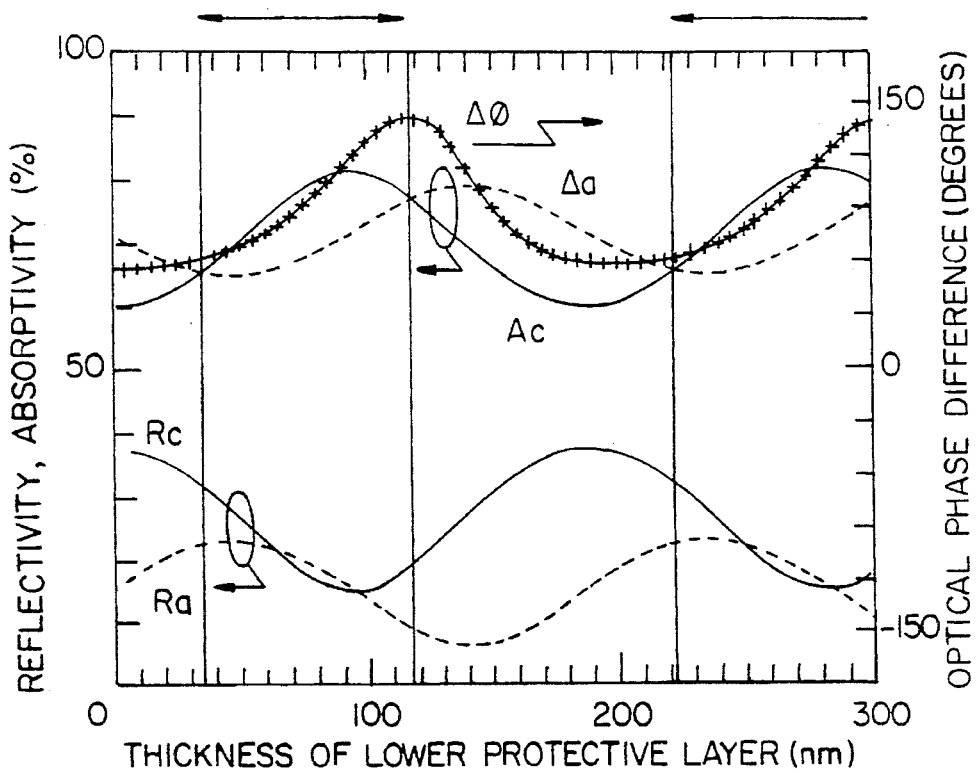
FIG. 7 is a diagram showing changes in reflectivity, changes in absorptivity and optical phase differences caused by phase change of a recording layer, depicted in relation to the thickness of a lower protective layer of the optical information-recording medium according to the invention.

Specimens of the recording medium were prepared in the same manner as in Example 1 with the exception that the thickness of the recording layer was set to 40 nm. Results of calculations are shown in FIG. 7. As indicated by arrows in FIG. 7, when the thickness of the lower protective layer was within a range of 35 nm to 118 nm and a range of 222 nm to 300 nm, absorptivity was higher in the crystalline state than in the amorphous state, with reflectivity in the crystalline state being 10% or higher.

EXAMPLE 6

On a substrate of polycarbonate with a diameter of 130 nun and a thickness of 1.2 mm, which was formed with a V-shaped guide groove, there were formed, by a sputtering method, one upon another, in the order mentioned hereafter, a lower protective layer of ZnS-20at%$SiO_2$ with a thickness of 100 nm, a recording layer of $Ge_2Sb_2Te_5$ with a thickness of 20 nm, an upper protective layer of ZnS-20at%$SiO_2$ with a thickness of 20 nm, and a reflective layer of Al with a thickness of 60 nm. Further, there was additionally formed thereon a layer of an ultraviolet ray-cured resin with a thickness of 9.2 μm to thereby obtain a specimen. Reflectivity of light irradiated on the substrate was 11.6% in the amorphous state, and 13.5% in the crystalline state. Optical calculations by the matrix method show that absorptivity was 67.7% in the amorphous state, and 80.5% in the crystalline state, and the optical phase difference between reflected light from the crystalline and reflected light from the amorphous state was −151.8°.

EXAMPLE 7

A specimen of the recording medium was prepared in the same manner as in Example 6 with the exception that the thickness of the lower protective layer of ZnS-20at%$SiO_2$ was set to 130 nm. Reflectivity of light irradiated on the substrate was 9.2% in the amorphous state, and 22.6% in the crystalline state. Optical calculations by the matrix method show that absorptivity was 69.5% in the amorphous state, and 72.1% in the crystalline state, and the optical phase difference between reflected light from the crystalline and reflected light from the amorphous state was −107.6°.

COMPARATIVE EXAMPLE 1

A specimen of a recording medium as Comparative Example 1 was prepared, which had a large difference in reflectivity between the crystalline state and the amorphous state, and a small optical phase difference between reflected light from the crystalline state and reflected light from the amorphous state, and exhibited a higher absorptivity in the amorphous state than in the crystalline state, in the same manner as in Example 6 with the exception that the thickness of a lower protective layer of ZnS-20at%SiO$_2$ was set to 180 nm. Reflectivity of light irradiated on the substrate was 4.2% in the amorphous state, and 33.9% in the crystalline state. Optical calculations by the matrix method show that absorptivity was 73.3% in the amorphous state, and 61.7% in the crystalline state, and the optical phase difference between reflected light from the crystalline state and reflected light from the amorphous state was small, assuming a value of −48.1°.

Figure 8:
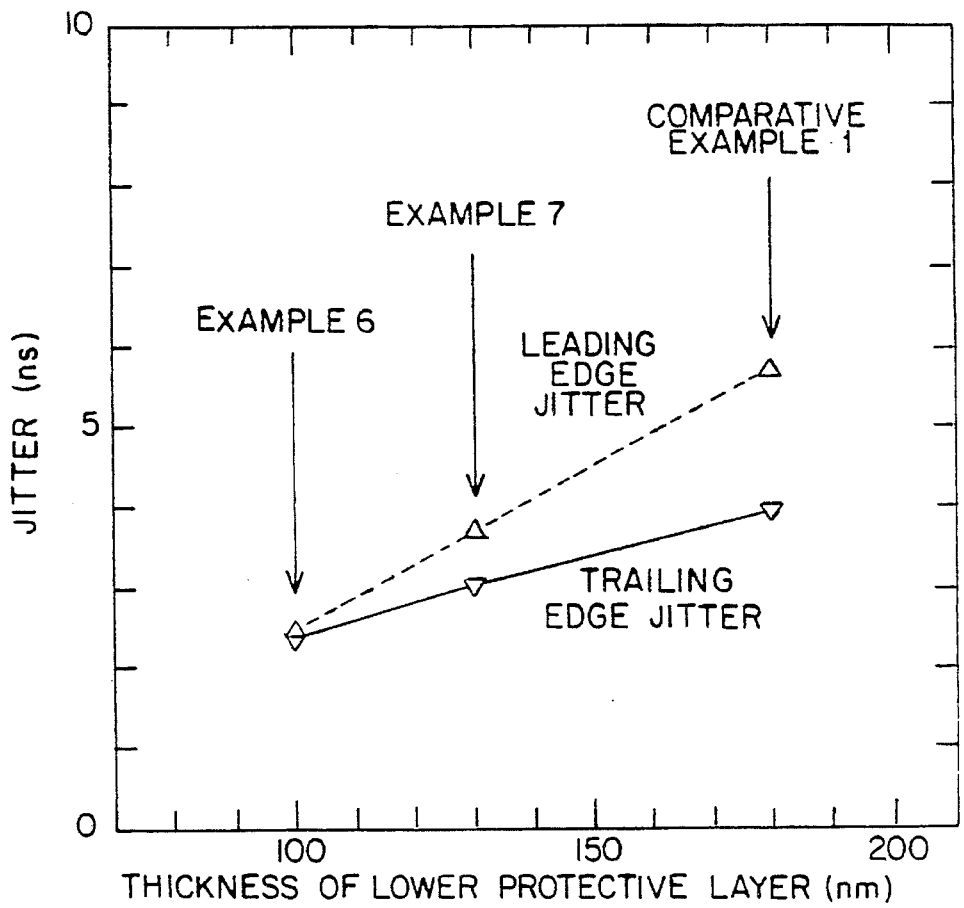
FIG. 8 is a diagram for comparing overwrite jitter produced by the technique of the present invention with one by the prior art.

Overwriting characteristics of Examples 6 and 7, and Comparative Example 1 were evaluated. Each of specimens in the form of a disk was rotated at a speed of 11.3 m/s. An optical head used in recording and erasing had an numerical aperture (NA) of 0.55 for the objective lens, through which a laser beam having a wavelength of 830 nm was emitted. The reproducing power was set to 1.0 mW. Mark edges were detected using zero cross points of a second differential signal. Jitter was detected by measuring a time interval from a leading edge of a pulse to that of a subsequent one, and a trailing edge of the former to that of the latter, independently of each other by the use of a time interval analyzer. The specimens were exposed to the laser beam in advance before recording to thereby change the recording layer from the amorphous state, in which it had been immediately after preparing each laminate of layers, to the crystalline state. Even in Example 6, in which reflectivity in the crystalline state was the smallest, reflectivity was equal to 13.5%, i.e. a value higher than 10%, so that there did not arise a problem of unstable servo-mechanism. FIG. 8 shows results of measurement of jitter in cases where after a signal of 3.7 MHz was once recorded, and then a signal of 2.12 MHz was overwritten thereon. It is recognized that compared with Comparative Example 1, the jitter became smaller in the order of Example 7, and Example 6. This is because by virtue of a layer arrangement with a high absorptivity in the crystalline state, the rate of temperature rise in the crystalline state was made equal to that of temperature rise in the amorphous state, which made an overwrite signal less liable to be deformed by a signal recorded in advance. Further, it is understood that the difference between the leading edge jitter and the trailing edge jitter became smaller also in the order of Comparative Example 1, Example 7, and Example 6. The leading edge jitter is more readily increased than the trailing edge jitter because the temperature of the recording layer at a leading edge rises more gently than that at a trailing edge, and hence the leading edge is more susceptible to variation in recording conditions. In Example 6 and Example 7, however, the rate of temperature rise in the crystalline sate and that of temperature rise in the amorphous state were made equal to each other to thereby reduce variation in the recording conditions, which contributed to reduction of the difference between the leading edge jitter and the trailing edge jitter.

COMPARATIVE EXAMPLE 2

A specimen of a disk as disclosed in Japanese Unexamined Patent Publication (Kokai) No. 1-149238, was prepared as Comparative Example 2, in which a reflective layer of a metal was made thinner to make it transparent, whereby the reflectivity and absorptivity of the reflective layer were reduced for the purpose of enhancing the absorptivity in the crystalline state. On a substrate of polycarbonate, there were formed, by the sputtering method, one upon another, in the order mentioned hereafter, a lower protective layer of ZnS-20at%SiO$_2$ with a thickness of 100 nm, a recording layer of Ge$_2$Sb$_2$Te$_5$ with a thickness of 20 nm, an upper protective layer of ZnS-20at%SiO$_2$ with a thickness of 20 nm, and a reflective layer of Au with a thickness of 20 nm. Further, there was additionally formed thereon a layer of an ultra-violet ray-cured resin with a thickness of 9.2 μm. Reflectivity of light irradiated on the substrate was 8.0% in the amorphous state, and 12.8% in the crystalline state. Optical calculations by the matrix method show that absorptivity was 71.7% in the amorphous state, and 81.7% in the crystalline state, that is, absorptivity being higher in the crystalline state, and the optical phase difference between reflected light from the crystalline state and reflected light from the amorphous state was large, assuming a value of −134.2°.

As to Comparative Example 2, jitter was measured, after a signal of 3.7 MHz was recorded and then a signal of 2.12 MHz was overwritten thereon. Very excellent results equivalent to those of Example 6 were obtained.

Figure 9:
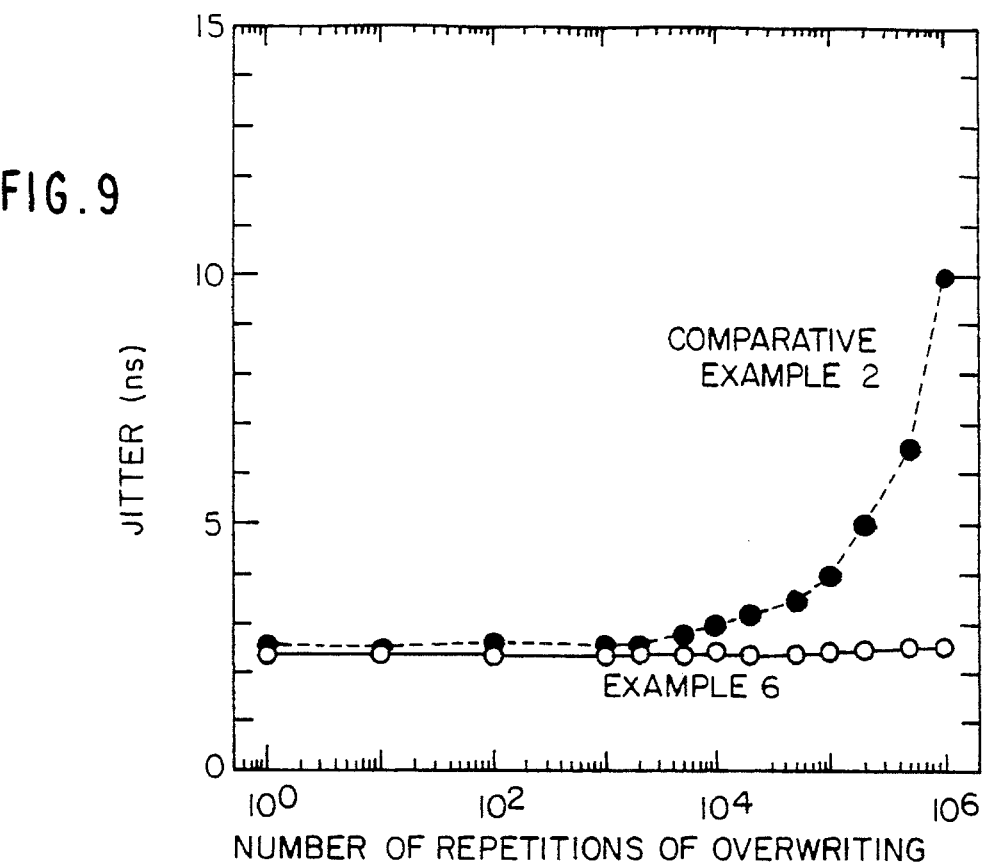
FIG. 9 is a diagram for comparing reliability in repetition of overwriting found with the technique of the present invention and one found with the prior art.

Then, reliability in repetition of overwriting was measured on Example 6 and Comparative Example 2. The overwriting characteristics were measured under the following conditions: a linear velocity of 11.3 m/s; a recording frequency of 3.7 MHz; duty for writing pulse of 45%; and recording power of 12 mW and erasing power of 6.5 mW for Example 6, and recording power of 11 mW and erasing power of 6 mW for Comparative Example 2. Results of measurement are shown in FIG. 9. In the case of Example 6, even after overwriting performed $10^6$ times, jitter was not increased, whereas in the case of Comparative Example 2, jitter started to increase from a time point at which overwriting was performed approximately $10^4$ times. In the case of Comparative Example 2, the thickness of the reflective layer was as thin as 20 nm, and hence the cooling rate was low, resulting in an increased thermal load on the medium, which more readily caused degradation of the characteristics of the recording medium when recording and erasing were repeatedly carried out.

EXAMPLE 8

Figure 10:
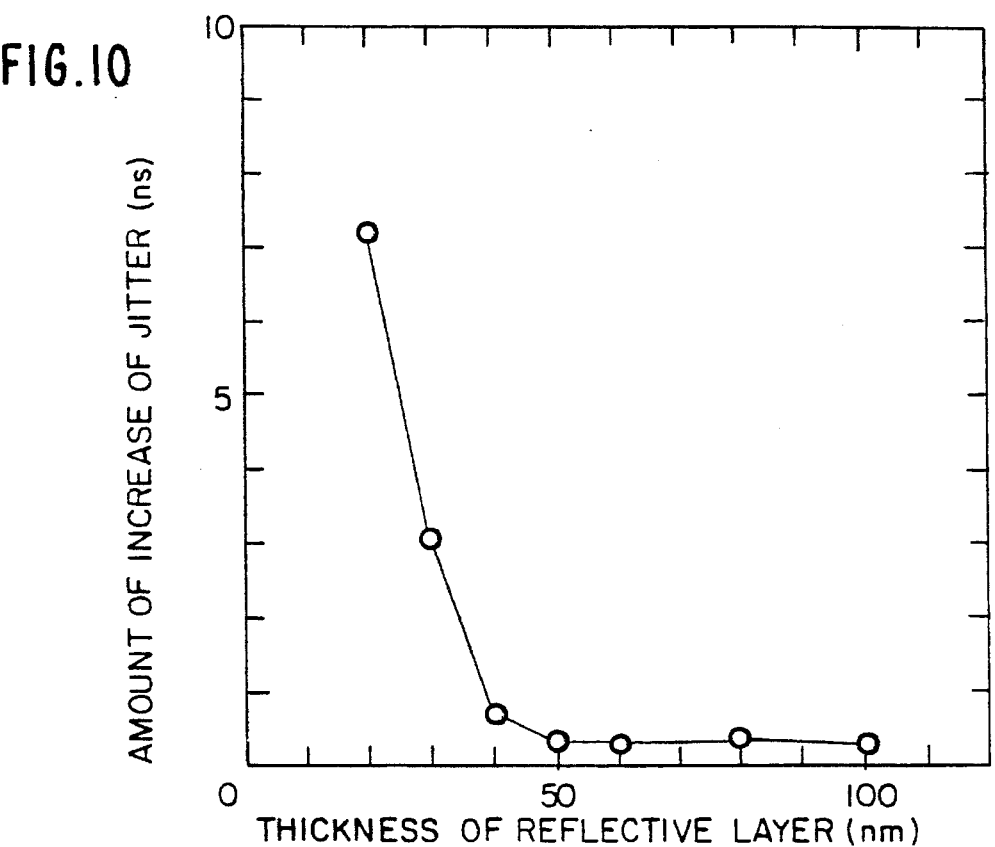
FIG. 10 is a diagram showing the relationship between the thickness of a reflective layer and an amount of increase of jitter after repetition of overwriting.

Similarly to Comparative Example 2, there were prepared specimens of a disk, with exception that the thickness of a reflective layer is varied, and then reliability in repetition of overwriting was measured. The relationship between the thickness of the reflective layer and the amount of increase in jitter detected after overwriting was repeatedly performed $10^6$ times is shown in FIG. 10. It is understood that if the reflective layer had a thickness of 40 nm or larger, jitter did not increase even after overwriting was performed $10^6$ times.

COMPARATIVE EXAMPLE 3

A specimen of a disk was prepared as Comparative Example 3, which had such a layer arrangement as exhibits very little difference in reflectivity and a large optical phase difference between reflected light from the crystalline state and reflected light from the amorphous state, as disclosed in Japanese Unexamined Patent Publication (Kokai) No.

2-73537, Japanese Unexamined Patent Publication (Kokai) No. 2-113451, and Japanese Unexamined Patent Publication (Kokai) No. 3-41638. On a substrate of polycarbonate, there were formed, by the sputtering method, one upon another, in the order mentioned hereafter, a lower protective layer of ZnS-20at%SiO$_2$ with a thickness of 250 nm, a recording layer of Ge$_2$Sb$_2$Te$_5$ with a thickness of 15 nm, an upper protective layer of ZnS-20at%SiO$_2$ with a thickness of 15 nm, and a reflective layer of Al with a thickness of 60 nm. Further, there was additionally formed thereon a layer of an ultraviolet ray-cured resin with a thickness of 9.2 μm. Reflectivity of light irradiated on the substrate was 8.3% in the amorphous state, and 8.5% in the crystalline state. Optical calculations by the matrix method show that absorptivity was 59.9% in the amorphous state, and 81.5% in the crystalline state, that is, absorptivity being higher in the crystalline state, and the optical phase difference between reflected light from the crystalline state and reflected light from the amorphous state was large, assuming a value of 139.1°. Jitter characteristics and reliability in repetition of recording and erasing of information were tried to be measured. However, since the reflectivity was equal to such a small value lower than 10%, the servo-mechanism was unstable to make the measurement very difficult.

EXAMPLE 9

On a substrate of polycarbonate with a diameter of 130 mm and a thickness of 1.2 mm, which was formed with a V-shaped guide groove, there were formed, by the sputtering method, one upon another, in the order mentioned hereafter, a lower protective layer of Ta$_2$O$_5$ with a thickness of 90 nm, a recording layer of Ge$_1$Sb$_4$Te$_7$ with a thickness of 20 nm, an upper protective layer of Ta$_2$O$_5$ with a thickness of 15 nm, and a reflective layer of Al with a thickness of 60 nm. Further, there was additionally formed thereon a layer of an ultraviolet ray-cured resin with a thickness of 9.2 μm to thereby obtain a specimen. Reflectivity of light irradiated on the substrate was 5.8% in the amorphous state, and 13.6% in the crystalline state. Optical calculations by the matrix method show that absorptivity was 79.8% in the amorphous state, and 78.9% in the crystalline state, and the optical phase difference between reflected light from the crystalline state and reflected light from the amorphous state was −85.5°. Optical constants used in the optical calculations were 1.96-i0.0 for Ta$_2$O$_5$ of the lower protective layer and the upper protective layer, 4.60-i1.60 for Ge$_1$Sb$_4$Te$_7$ of the recording layer in the amorphous state, and 5.70-i3.52 for the same in the crystalline state.

As to the specimen of Example 9, a signal of 3.7 MHz was recorded, and then a signal of 2.12 MHz was overwritten thereon. Measurement of jitter was performed, obtaining more excellent results than those obtained with Comparative Example 1, similarly to Example 3. Jitter did not increase even after overwriting was performed 10$^6$ times.

As described heretofore, the present invention is very effective in reducing overwriting jitter occurring with a phase change optical disk. For recording in an even higher density, the adaptation of a light source such that it emits a laser beam having a reduced wavelength, is effective, since it permits reduction of the diameter of the laser beam.

EXAMPLE 10

Therefore, to demonstrate that the present invention is also effective for a short wavelength of 690 nm, which is shorter than that used in the above examples, specimens of Example 10 were prepared by forming, on a substrate of polycarbonate, one upon another in the order mentioned hereafter, a lower protective layer of ZnS-20at%SiO$_2$ with a thickness in a range of 100 nm to 300 nm, a recording layer of Ge$_2$Sb$_2$Te$_5$ with a thickness of 15 nm, an upper protective layer of ZnS-20at%SiO$_2$ with a thickness of 20 nm, and a reflective layer of Al with a thickness of 60 nm.

Figure 11:
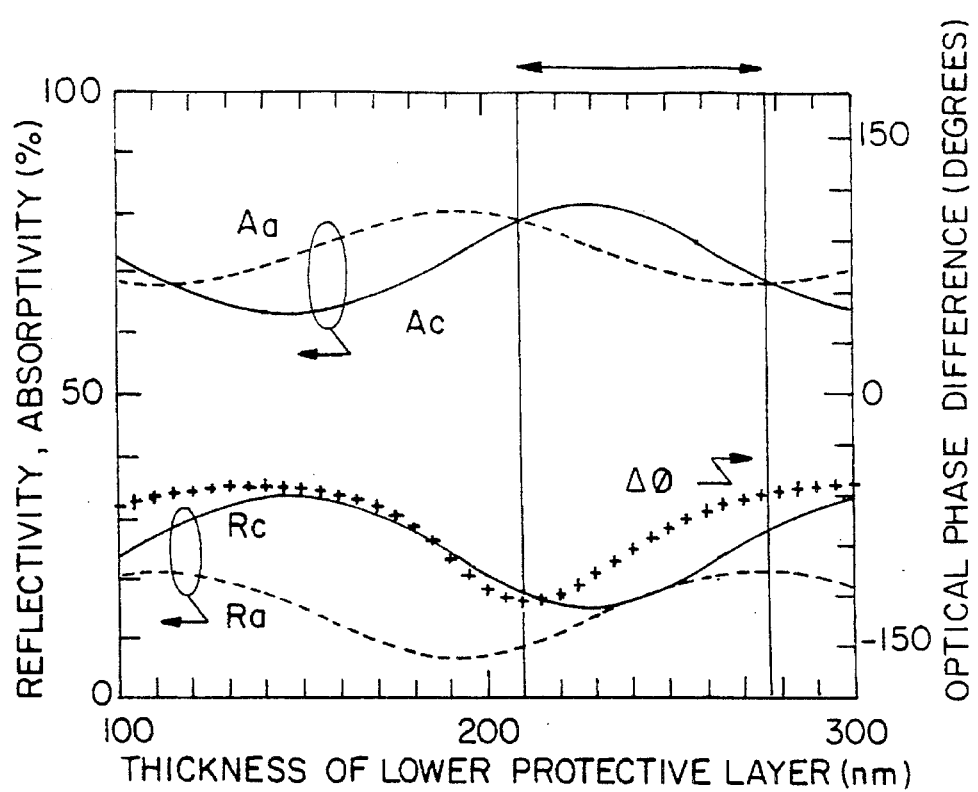
FIG. 11 is a diagram showing changes in reflectivity, changes in absorptivity and optical phase differences caused by phase change of a recording layer, depicted in relation to the thickness of a lower protective layer of the optical information-recording medium according to the invention.

Then, there were calculated a value of reflectivity Rc and a value of absorptivity Ac of a recording medium thus arranged and Rc exhibited when the recoding layer was in the crystalline state, and a value of reflectivity Ra and a value of absorptivity Aa of same when the recording layer was in the amorphous state, as well as the optical phase difference Δφ between reflected light from the amorphous state and that from the crystalline state. FIG. 11 shows results of the calculations. The wavelength of a laser beam was 690 nm. Optical constants of the lower protective layer and the upper protective layer were 2.1-i0.0 for the wavelength of 690 nm, and an optical constant of the recording layer 4.03-i3.87 in the crystalline state, and 3.79-i1.36 in the amorphous state, and an optical constant of the reflective layer 1.73-i7.96. As indicated by arrows in FIG. 11, when the thickness of the lower protective layer was within a range of 210 nm to 277 nm, absorptivity was higher in the crystalline state than in the amorphous state, with reflectivity in the crystalline state being 10% or higher.

EXAMPLE 11

Figure 12:
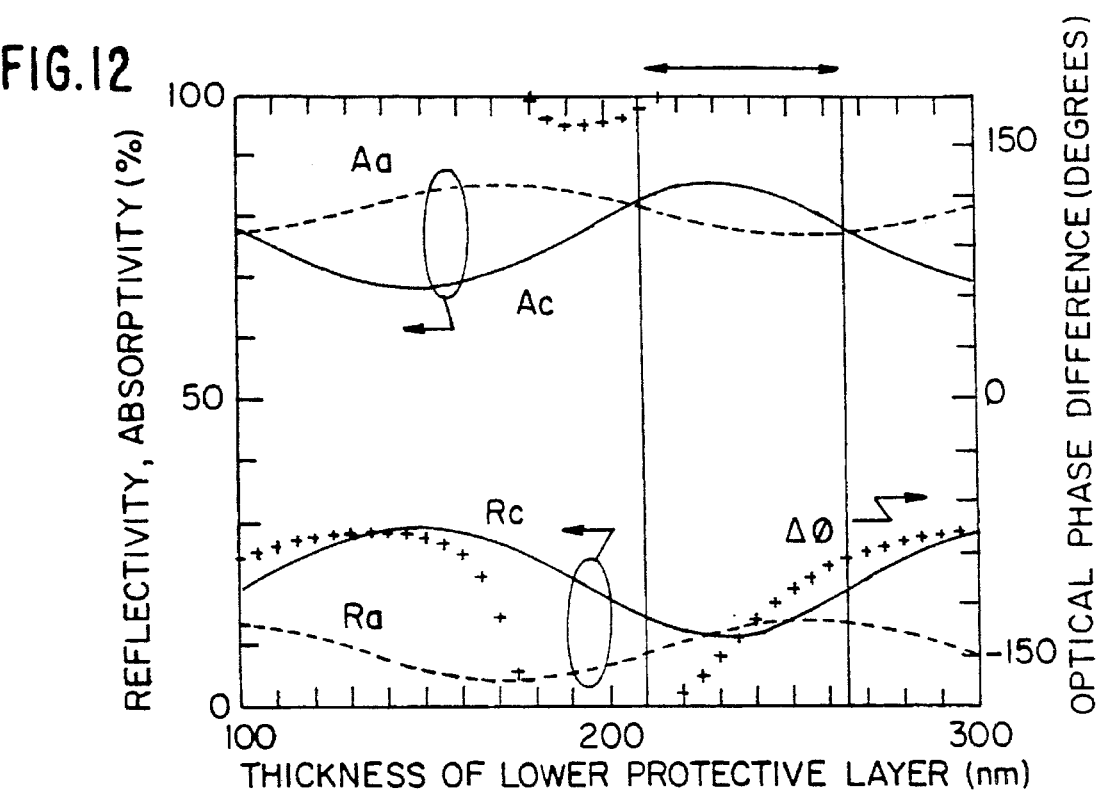
FIG. 12 is a diagram showing changes in reflectivity, changes in absorptivity and optical phase differences caused by phase change of a recording layer, depicted in relation to the thickness of a lower protective layer of the optical information-recording medium according to the invention.

Specimens of the recording medium were prepared in the same manner as in Example 10 with the exception that the thickness of the upper protective layer was set to 30 nm. Results of calculations are shown in FIG. 12. As indicated by arrows in FIG. 12, when the thickness of the lower protective layer was within a range of 210 nm to 265 nm, absorptivity was higher in the crystalline state than in the amorphous state, with reflectivity in the crystalline state being 10% or higher. Further, in this range, the optical phase difference between reflected light from the crystalline state and reflected light from the amorphous state is large, assuming a value of 90°.

EXAMPLE 12

On a substrate of polycarbonate with a diameter of 130 mm and a thickness of 1.2 mm, which was formed with a V-shaped guide groove, there were formed, by the sputtering method, one upon another, in the order mentioned hereafter, a lower protective layer of ZnS-20at%SiO$_2$ with a thickness of 230 nm, a recording layer of Ge$_2$Sb$_2$Te$_5$ with a thickness of 15 nm, an upper protective layer of ZnS-20at%SiO$_2$ with a thickness of 20 nm, and a reflective layer of Al with a thickness of 60 nm. Further, there was additionally formed thereon a layer of an ultraviolet ray-cured resin with a thickness of 9.2 μm to thereby obtain a specimen. Reflectivity of light irradiated on the substrate was 13.6% in the amorphous state, and 14.9% in the crystalline state. Optical calculations by the matrix method show that absorptivity was 74.2% in the amorphous state, and 81.0% in the crystalline state, and the optical phase difference between reflected light from the crystalline state and reflected light from the amorphous state was −105.2°.

COMPARATIVE EXAMPLE 4

A specimen of a recording medium as Comparative Example 4 was prepared, which had a large difference in reflectivity, and a small optical phase difference between reflected light from the crystalline state and reflected light from the amorphous state, and exhibited a higher absorptivity in the amorphous state than in the crystalline state, in the same manner as in Example 12 with the exception that the thickness of the lower protective layer of ZnS-20at%SiO$_2$ was set to 160 nm. Reflectivity of light irradiated on the substrate was 11.9% in the amorphous state, and 32.5% in the crystalline state. Optical calculations by the matrix method show that absorptivity was 75.6% in the amorphous state, and 64.3% in the crystalline state, and the optical phase difference between reflected light from the crystalline state and reflected light from the amorphous state was small, assuming a value of −59.0°.

Overwriting characteristics of Example 12 and Comparative Example 4 were evaluated. Each of specimens in the form of a disk was rotated at a speed of 9.42 m/s. An optical head used in recording and erasing had an numerical aperture (NA) for the objective lens of 0.55, through which a laser beam having a wavelength of 690 nm was emitted. The reproducing power was set to 1.0 mW. The specimens were exposed to the laser beam in advance before recording to thereby change the recording layer from the amorphous state, in which it had been immediately after preparation of the laminate of layers, to the crystalline state. Even in Example 12, in which reflectivity in the crystalline state was relatively small, the reflectivity was equal to 14.9%, which is a value higher than 10%, so that there did not arise a problem of unstable servo-mechanism. Jitter was measured, after a signal of 2.90 MHz was once recorded and then a signal of 1.81 MHz was overwritten thereon. In Example 12, leading edge jitter detected for first recording was 1.3 ns, and trailing edge jitter detected for the same was 1.2 ns, whereas leading edge jitter detected for overwriting was 2.0 ns and trailing edge jitter for the same was 1.90 ns, showing that amounts of increase in jitter caused by overwriting were small. Further, in spite of the small difference in reflectivity, there was obtained an excellent carrier-to-noise (C/N) ratio of 60.3 dB. On the other hand, with Comparative Example 4, leading edge jitter detected for first recording was 1.8 ns, and trailing edge jitter for the same was 1.6 ns, showing that they were small enough. However, leading edge jitter detected for overwriting was 3.8 ns, and trailing edge jitter for the same was 2.6 ns, proving that amounts of increase in jitter caused by overwriting were large. The carrier-to-noise (C/N) ratio was excellent, assuming a value of 61.5 dB. As described above, it is confirmed that the present invention is also effective for a laser beam having a wavelength of 690 nm.

Figure 1:
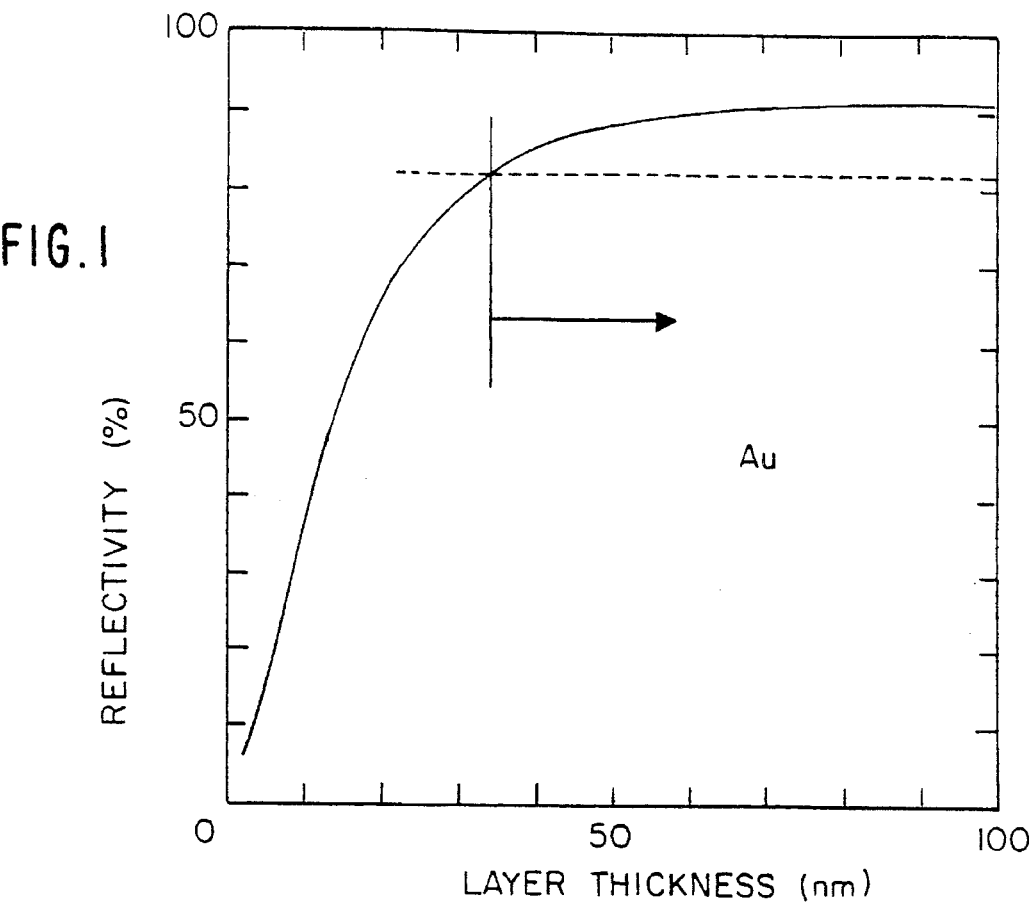
FIG. 1 is a diagram showing the relationship between the thickness of a reflective layer and reflectivity obtained thereby.

The optical information-recording medium of the present invention is constructed such that reflectivity and phase of reflected light change with a change in the optical properties of a recording layer, which enables a highquality signal to be obtained without increasing the difference in reflectivity between the crystalline state and the amorphous state. Therefore, the absorptivity of the recording layer exhibited when the recording layer is in the crystalline state can be enhanced more easily, which provides excellent overwriting characteristics in mark edge recording. Further, since reflectivity exhibited in the crystalline state of the recording layer is high, the servo-mechanism can be stabilized. Further, since it is possible to enhance the absorptivity of the recording layer exhibited in the crystalline state thereof without reducing the thickness of the reflective layer, thermal load on the medium is reduced to realize a high reliability in repetition of recording and erasing. The thickness of the reflective layer is set to such a range as indicated by the arrows in FIG. 1, in which the reflectivity of the reflective layer is 90% or higher of the reflectivity of a bulk form of the substance used for the reflective layer. Therefore, the reflectivity of the reflective layer is not readily varied, permitting a large manufacturing tolerance of the reflective layer.

As describe heretofore, according to the optical information-recording medium of the present invention, in forming a phase change optical disk, the manufacturing tolerance of layers in respect of thickness thereof becomes large, and at the same time excellent overwriting characteristics in mark edge recording can be obtained, with a high reliability in repetition of recording and erasing. In short, it is possible to obtain a highly reliable phase change optical disk with a larger storage capacity, which is comprised of layers which can easily be formed.

What is claimed is:

1. An optical information-recording medium including a substrate, and a lower protective layer, a recording layer, an upper protective layer and a reflective layer, formed on said substrate, said recording layer exhibiting different optical properties dependent on different thermal histories of a rise and a fall in temperature caused by irradiation of a laser beam on said substrate, wherein said optical information-recording medium has a layer structure constructed such that reflectivity of said optical information-recording medium and a phase of light reflected therefrom vary with said change in said optical properties of said recording layer, with absorptivity of light of said recording layer being larger when said recording layer is in a crystalline state than when said recording layer is in an amorphous state, and at the same time, reflectivity exhibited when said recording layer is in said crystalline state being 10% or higher; and wherein said reflective layer has a thickness set such that a value of reflectivity of said reflective layer exhibited in the form of a single layer is 90% or more of a value of reflectivity of a bulk form of a substance of said reflective layer, or to a value of 40 nm or larger.

2. The optical information-recording medium according to claim 1, wherein the substrate is formed of a polycarbonate resin.

3. The optical information-recording medium according to claim 1, wherein the lower and the upper protective layers are formed of a single substance selected from nitrides, for example, Si$_3$N$_4$ and AlN, which are transparent, oxides, for example, SiO, SiO$_2$ and Ta$_2$O$_5$, and chalcogenides, for example, ZnS, ZnSe, and MnS, or a mixture thereof.

4. The optical information-recording medium according to claim 1, wherein the recording layer is formed of a substance which has its optical properties changed depending on different thermal histories of a rise and a fall of temperature caused by irradiation of a laser beam thereto at different energy levels, e.g. a compound containing a chalcogen-series atom, for example, Se and Te.

5. The optical information-recording medium according to claim 1, wherein the reflective layer is formed of a single substance selected from metals, for example, Al, Au, Ti, Cr, Mo, W and Ta, or a mixture of such a substance and an additive, or an alloy of such a substance, or semiconductors, for example, Si and Ge, which are high in refractive index.

6. The optical information-recording medium according to claim 1, wherein the substrate is formed of a polycarbonate resin; the lower protective layer is formed of ZnS-20at%SiO$_2$ or Ta$_2$O$_5$ with a thickness of 5–300 nm; the recording layer is formed of Ge$_2$Sb$_2$Te$_5$ or Ge$_1$Sb$_4$Te$_7$ with thickness of 15–40 nm; the upper protective layer is formed ZnS-20at%SiO$_2$ or Ta$_2$O$_5$ with a thickness of 15–30 nm; and the reflective layer is formed of Al or Au with a thickness of not less than 40 nm.

7. The optical information-recording medium according to claim 6, wherein the reflective layer is covered with a layer of an ultraviolet ray-cured resin.

8. The optical information-recording medium according to claim 1, wherein the thickness of the lower protective layer is within a range of 43 nm to 137 nm and 232 nm to 300 nm, the thickness of the recording layer is 20 nm, the thickness of the upper protective layer is 20 nm, and the thickness of the reflective layer is 60 nm.

9. The optical information-recording medium according to claim 1, wherein the thickness of the recording layer is 15 nm, the thickness of the upper protective layer is 20 nm, the thickness of the reflective layer is 60 nm, and the thickness of the lower protective layer is within a range of 5 nm to 67 nm, 102 nm to 256 nm, and 291 nm to 300 nm.

10. The optical information-recording medium according to claim 1, wherein the thickness of the recording layer is 25 nm, the thickness of the upper protective layer is 20 nm, the thickness of the reflective layer is 20 nm, the thickness of the reflective layer is 60 nm, and the thickness of the lower protective layer is within a range of 56 nm to 107 nm, and 244 nm to 296 nm.

11. The optical information-recording medium according to claim 1, wherein the thickness of the recording layer is 30 nm, the thickness of the upper protective layer is 20 nm, the thickness of the reflective layer is 60 nm, and the thickness of the lower protective layer is within a range of 42 nm to 122 nm and 230 nm to 300 nm.

12. The optical information-recording medium according to claim 1, wherein the thickness of the recording layer is 40 nm, the thickness of the upper protective layer is 20 nm, the thickness of the reflective layer is 60 nm, and the thickness of the lower protective layer is within a range of 35 nm to 118 nm and 222 nm to 300 nm.

13. The optical information-recording medium according to claim 1, wherein the reflective layer is covered with a layer of an ultraviolet ray-cured resin, and the thickness of the recording layer is 20 nm, the thickness of the lower protective layer is 100 nm, the thickness of the upper protective layer is 20 nm, and the thickness of the reflective layer is 60 nm.

14. The optical information-recording medium according to claim 1, wherein the thickness of the upper protective layer is 20 nm, and the reflective layer is covered with a layer of an ultraviolet ray-cured resin, and the thickness of the lower protective layer is 130 nm, the thickness of the reflective layer is 60 nm, the thickness of the recording layer is 20 nm.

15. The optical information-recording medium according to claim 1, wherein the reflective layer is covered with a layer of an ultraviolet ray-cured resin, and the thickness of the lower protective layer is 180 nm, the thickness of the recording layer is 20 nm, the thickness of the upper protective layer is 40 nm, and the thickness of the reflective layer is 60 nm.

16. The optical information-recording medium according to claim 1, wherein the reflective layer is covered with a layer of an ultraviolet ray-cured resin, and the thickness of the lower protective layer is 100 nm, the thickness of the recording layer is 20 nm, the thickness of the upper protective layer is 20 nm, and the thickness of the reflective layer is 20 nm.

17. The optical information-recording medium according to claim 1, wherein the thickness of the lower protective layer is 250 nm, the thickness of the recording layer is 15 nm, the thickness of the upper protective layer is 15 nm, and the thickness of the reflective layer is 60 nm.

18. The optical information-recording medium according to claim 1, wherein the thickness of the lower protective layer is 90 nm, the thickness of the recording layer is 20 nm, the thickness of the upper protective layer is 15 nm, and the thickness of the reflective layer is 60 nm.

19. The optical information-recording medium according to claim 1, wherein the thickness of the recording layer is 50 nm, the thickness of the upper protective layer is 20 nm, the thickness of the reflective layer is 60 nm, and the thickness of the overprotective layer is within a range of 100 nm to 300 nm.

20. The optical information-recording medium according to claim 1, wherein the thickness of the recording layer is 15 nm, the thickness of the upper protective layer is 20 nm, the thickness of the reflective layer is 60 nm, and the thickness of the lower protective layer is within a range of 210 nm to 277 nm.

21. The optical information-recording medium according to claim 1, wherein the thickness of the recording layer is 15 nm, the thickness of the overprotective layer is 30 nm, the thickness of the reflective layer is 60 nm, and the thickness of the lower protective layer is within a range of 210 nm to 277 nm.

22. The optical information-recording medium according to claim 1, wherein the reflective layer is covered with a layer of an ultraviolet ray-cured resin, and the thickness of the lower protective layer is 230 nm, the thickness of the recording layer is 15 nm, the thickness of the upper protective layer is 20 nm, and the thickness of the reflective layer is 60 nm.

* * * * *